US006590321B1

(12) United States Patent
Komoda et al.

(10) Patent No.: US 6,590,321 B1
(45) Date of Patent: Jul. 8, 2003

(54) FIELD EMISSION ELECTRON SOURCE

(75) Inventors: Takuya Komoda, Sanda (JP); Tsutomu Ichihara, Hirakata (JP); Koichi Aizawa, Neyagawa (JP); Nobuyoshi Koshida, Kodaira (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 09/404,656

(22) Filed: Sep. 24, 1999

(30) Foreign Application Priority Data

Sep. 25, 1998 (JP) .......................................... 10-272342
Apr. 23, 1999 (JP) .......................................... 11-115707

(51) Int. Cl.$^7$ ........................... H01J 1/312; H01J 19/24
(52) U.S. Cl. ........................................ 313/310; 313/496
(58) Field of Search ............................ 313/495, 496, 313/497, 309, 310, 311; 445/50, 51

(56) References Cited

U.S. PATENT DOCUMENTS

| 3,665,241 A | 5/1972 | Spindt et al. ................ 313/309 |
| 5,360,759 A | 11/1994 | Stengl et al. .................. 437/20 |
| 5,430,300 A | 7/1995 | Yue et al. ...................... 445/50 |
| 5,726,464 A | 3/1998 | Kumomi et al. ............. 257/103 |
| 5,990,605 A * | 11/1999 | Yoshikawa et al. .......... 313/310 |
| 6,249,080 B1 * | 6/2001 | Komoda et al. ............. 313/310 |

FOREIGN PATENT DOCUMENTS

| EP | 798761 | 10/1997 | ............. H01J/31/12 |
| EP | 874384 | 10/1998 | ............. H01J/1/30 |
| EP | 913849 | 5/1999 | ............. H01J/1/30 |
| JP | 08250766 | 9/1996 | ............ H01L/33/00 |
| JP | 09259795 | 10/1997 | ............. H01J/31/12 |
| JP | 10269932 | 10/1998 | ............. H01J/1/30 |

OTHER PUBLICATIONS

H.B. Michaelson, "The work function of the elements and it's periodicity", J. Appl. Phys., vol. 48, No. 11, Nov. 1977, pp. 4729–4733.
C.A. Spindt et al., "Field Emitter Arrays for Vacuum Microelectronics" IEEE Transactions on Electron Devices, vol. 38, No. 10, Oct. 1991, pp. 2355–2363.
English language abstract of JP 8–250766. Sep. 27, 1996.
English language abstract of JP 9–259795. Oct. 3, 1997.
English language abstract of JP 10–269932. Oct. 9, 1998.

(List continued on next page.)

Primary Examiner—Michael H. Day
(74) Attorney, Agent, or Firm—Greenblum & Bernstein, P.L.C.

(57) ABSTRACT

In a field emission electron source, a strong electric field drift part 106 is formed on the n-type silicon substrate on the principal surface thereof and a surface electrode 107 made of a gold thin film is formed on the strong electric field drift part 106. And the ohmic electrode 2 is formed on the back surface of the n-type silicon substrate 101. In this field emission electron source 110, when the surface electrode 107 is disposed in the vacuum and a DC voltage is applied to the surface electrode 107 which is of a positive polarity with respect to the n-type silicon substrate 101 (ohmic electrode 2), electrons injected from the n-type silicon substrate 101 are drifted in the strong electric field drift part 106 and emitted through the surface electrode 107. The strong electric field drift part 106 comprises a drift region 161 which has a cross section in the structure of mesh at right angles to the direction of thickness of the n-type silicon substrate 1, which is an electrically conductive substrate, and a heat radiation region 162 which is filled in the voids ox the mesh and has a heat conduction higher than that of the drift region 161.

17 Claims, 12 Drawing Sheets

OTHER PUBLICATIONS

T.Oguro et al., "Mechanism of the visible electroluminescence from metal/porous silicon/n–Si devices", J.Appl. Phys. 81(3), pp. 1407–1412, Feb. 1, 1997.

R. Sedlacik et al., "Photoconductivity study of self–supporting porous silicon", Thin Solid Films 255, pp. 269–271 (1995). (No month).

Xia Sheng et al., "Surface Emitting Cold Cathode Based on Porous Silicon", Technical Report of IEICE, ED96–141, pp. 41–46 (Dec. 1996).

T. Komoda et al., "Mechanism of efficient and stable surface–emitting cold cathode based on porous polycrystalline silicon films", Journal of Vacuum Science & Technology B, vol. 17, No. 3, pp. 1076 et seq. (May 1999).

* cited by examiner 6   porous polysilicon layer
61  polysilicon
62  silicon oxide layer
63  micro-crystal silicon layer
64  silicon oxide layer 101 n - substrate
102 ohmic electrode
106 strong field drift region
107 surface electrode
110 field emission electron source
161 drift region
162 heat radiation region

FIELD EMISSION ELECTRON SOURCE

DETAILED DESCRIPTION OF THE INVENTION

1. Field of the Invention

This invention relates to a field emission electron source for emitting electrons due to the field emission using a semiconductor material without heating and a method of manufacturing the same. More particularly, the present invention relates to a field emission electron source applicable to a planar light emitting apparatus, a display apparatus, and a solid vacuum device, and a method of producing the same.

2. Prior Art

As field emission electron sources, those using the so-called Spindt type electrode such as disclosed in, for example, U.S. Pat. No. 3,665,241 are well known. The Spindt type electrode comprises a substrate having a multitude minute emitter chips of a triangular pyramid shape disposed thereon and gate layers that have emission holes through which tips of the emitter chips are exposed and are insulated from the emitter chips. In this structure, a high voltage is applied in a vacuum atmosphere to the emitter chips as negative electrode with respect to the gate layer, electron beams can be emitted from the tips of the emitter chips through the emission holes.

However, the production process of the Spindt type electrode is complicated and it is difficult to make a multitude of emitter chips of a triangular pyramid shape with high accuracy and hence, difficult to make a device of large emission area when applying this technology to, for example, a planar light emitting apparatus or a display apparatus. Also with the Spindt type electrode, since the electric field is concentrated on the tip of the emitter chip, emitted electrons ionize various residual gases into positive ions where the degree of vacuum is low and the residual gas exists in the vicinity of the tips of the emitter chips. Therefore, the positive ions impinge on the tip of the emitter chips and eventually damage the tips of the emitter chips, resulting in such problems that the current density and efficiency of the emitted electrons become unstable and the service life of the emitter chips decreases. Thus, the Spindt type electrode has such a drawback that the atmosphere in which it is used must be pumped to a high degree of vacuum ($10^{-5}$ Pa to $10^{-6}$ Pa) in order to avoid the problems described above, resulting in higher cost and difficult handling.

In order to overcome the drawback described above, field emission electron sources of MIM (Metal Insulator Metal) type and MOS (Metal Oxide Semiconductor) type have been proposed. The former is a field emission electron source of a planar configuration having a laminated structure of metal-insulation film-metal and the latter is the same structure one of a metal-oxide film-semiconductor. However, it is necessary to reduce the thickness of the insulation film or the oxide film in order to improve the electron emitting efficiency to thereby increase the number of electrons emitted with these types of field emission electron sources, while making the insulation film or the oxide film too thin may lead to dielectric breakdown when a voltage is applied between the upper and lower electrodes of the laminated structure described above. Thus there has been such a problem that, in order to avoid the dielectric breakdown of the insulator film, the electron emitting efficiency (pullout efficiency) cannot be made too high because there is a limitation on the reduction of the thickness of the insulation film or the oxide film.

A different field emission electron source has recently been proposed in Japanese Patent Kokai Publication No. 8-250766. According to this publication, the field emission electron source is made by using a single-crystal semiconductor substrate such as a silicon substrate, forming a porous semiconductor layer (a porous silicon layer, for example) by anodization of one surface of the semiconductor substrate, and forming a surface electrode made of a thin metal film on the porous semiconductor layer. A voltage is adapted between the semiconductor substrate and the surface electrode to cause the field emission electron source (semiconductor cold electron emitting device) to emit electrons.

However, in the structure disclosed in Japanese Patent Kokai Publication No. 8-250766, there is such a drawback that the popping phenomenon is likely to occur during electron emission. In the field emission electron source in which the popping phenomenon is likely to occur during electron emission, the unevenness in amount of electrons emitted is likely to occur. Thus, when this type of field emission electron source is used in a planar light emitting device and a display apparatus, there is such a drawback that the light is not emitted uniformly.

Then, the inventors studied whale-heartedly the above drawbacks and found out that in the field emission electron source as disclosed in Japanese Patent Kokai Publication No. 8-250766, since a porous silicon layer formed by making the entire surface of the single crystal substrate on the principal surface side porous constructs a strong electric field drift layer into which electrons are injected, the strong electric field drift layer has a heat conductivity lower than that of the crystal substrate and the field emission electron source has a high thermal insulating characteristics, which results in that the temperature of the substrate rises relatively largely when voltage is applied and current is flown. Further the inventors found out that electrons are thermally excited and electrical resistivity of the single-crystal semiconductor substrate decrease when the temperature of the substrate increases, accompanied by increase of the amount of electrons emitted. Therefore, this structure is susceptible to the popping phenomenon during electron emission leading to unevenness in amount of electrons emitted.

Based on the above findings, the present invention has been accomplished. That is, the object of the present invention is to provide a field emission electron source capable of achieving a stable emission of electrons with high efficiency at a low cost and a method of producing the same.

THE SUMMARY OF THE INVENTION

In order to achieve the above-mentioned object, according to a first aspect of the present invention, there is provided a field electron source comprising an electrically conductive substrate having principal surfaces; a strong electric field drift layer formed on one of the principal surfaces of said electrically conductive substrate and a surface electrode made of a thin electrically conductive film which is formed on said strong electric field drift layer, wherein a voltage is applied to said surface electrode used as a positive electrode with respect to said electrically conductive substrate, thereby electrons injected from said electrically conductive substrate being drifted in said strong electric effect drift layer and emitted through said surface electrode, characterized in that said strong electric field drift layer comprises at least a) semiconductor crystal regions formed in a manner to stand up vertically on said principal surface of the electrically conductive substrate and b) semiconductor micro-crystal regions having nano-structures intervened between the semiconductor crystal regions coated with an insulating film which has a thickness smaller than the crystal grain size of said semiconductor micro-crystal region and is formed on the surface of the semiconductor micro-crystal. Therefore, 1) the dependency on the degree of vacuum of the electron emission characteristic is low and no popping phenomenon occurs during the electron emission. Also the electrons can be emitted with a high stability and a high efficiency. 2) As the electrically conductive substrate, the semiconductor substrate such as a single-crystal silicon substrate and the substrate such as a glass substrate with a conductive film formed thereon can be used, in which case it is made possible to achieve larger emission area and lower production cost than in the case of using the conventional porous semiconductor layer and of the Spindt-type electrode, as in the conventional example.

In the present invention, said semiconductor crystal is preferably polysilicon. But other single crystal, poly-crystal and amorphous semiconductor, for example, poly-crystal semiconductor of IV group, IV—IV group compound semiconductor such as SiC, III–V group compound semiconductor such as Gabs, GaN and InP, and II–VI group semiconductor such as ZnSe may be used.

In the present invention, the semiconductor micro-crystal region is formed by making the single crystal or poly-crystal semiconductor porous by the anodization, which constructs a drift region; the details thereof are described in U.S. Pat. No. 6,249,080, the content whereof is incorporated in this specification by reference. The insulating film is preferably made of an oxide film or a nitride film.

In order to achieve the above-mentioned object, according to a second aspect of the present invention, there is provided a field electron source comprising an electrically conductive substrate, a strong electric field drift part formed on one of the principal surface of said electrically conductive substrate and a surface electrode of a thin metal film formed on said strong electric field drift part, wherein a DC voltage is applied to said surface electrode used as a positive electrode with respect to the electrically conductive substrate, thereby electrons injected from the electrically conductive substrate being drifted in said strong electric effect drift part and emitted through said surface electrode, wherein the strong electric field drift part preferably comprises drift regions in which the electrons are drifted and heat radiation regions which have a heat conductivity higher than that of the drift region, the drift regions and the heat radiation regions are mixed and distributed uniformly. In a typical case, the drift regions has a mesh-like cross section at right angles to the direction of thickness of the electrically conductive substrate and, the heat radiation regions which are built up in the mesh openings. Therefore, the heat generated in the drift region is radiated through the heat radiation region in the strong electric field drift part and thus, no popping phenomenon occurs during the electron emission and the electrons can be emitted with a high stability and a high efficiency.

The drift region may be a layer made by alternately laminating layers whose porosity are different from each other in the direction of thickness of the electrically conductive substrate, thereby the efficiency of the electron emission can be enhanced. And said drift region may be a layer whose porosity changes continuously in a direction of thickness of the electrically conductive substrate, thereby the efficiency of the electron emission can be enhanced.

The openings or void of the mesh-like drift region is preferably in the shape of a minute polygon or a minute circle.

The drift regions and heat radiation regions may be selected from the group consisting of a single crystal, poly-crystal and amorphous of silicon or silicon carbide. The heat radiation region is preferably a silicon or silicon carbide with an insulating film on the surface thereof and therefore, the heat radiation region has a high heat conduction characteristic and a electrical insulating characteristic, resulting in the increase of heat radiation. The insulating film is preferably an oxide film or a nitride film.

The surface electrode is preferably made of a thin metal, but transparent and conductive films of ITO, SnO2 and ZnO2 can be used for the surface electrode.

The electrically conductive substrate is preferably a substrate on one of the principal surface of which the electrically conductive film is formed and therefore, it is made possible to achieve larger emission area and lower production cost than in the case of using a semiconductor substrate such as a single-crystal silicon substrate as an electrically conductive substrate.

In order to produce the field emission electron source, a part of the semiconductor region on the principal surface of the electrically conductive substrate is made porous by anodization fin the direction of thickness, and then the semiconductor region and the porous semiconductor region are oxidized to form a heat radiation region and a drift region, finally a surface electrode made of a thin metal film being formed on the strong electric field drift part comprising the drift region and the heat radiation region.

Because a part of the semiconductor region on the principal surface of the electrically conductive substrate is made porous and then oxidized, the drift region and the heat radiation region can be formed using the same semiconductor material. Therefore, it is not necessary to form the drift region and the radiation region separately from the beginning of the preparation and the shape of the pattern of the drift region and the heat radiation region can be easily controlled. As a result, a field emission electron source in which no popping phenomenon occurs during the electron emission and electrons can be emitted with a high stability and a high efficiency can be achieved at a low cost.

Where said anodization is effected, 1) if the anodization is carried out after a column-like poly-crystal semiconductor layer stood up vertically on the surface of the electrically conductive substrate was made, mixture structure of the semiconductor crystal regions and the semiconductor micro-crystal regions can be easily made. 2) If the mask has cross-section shape of a mesh with openings like a minute polygon is arranged on an area on which the heat radiation region is to be formed on the semiconductor region and then, the anodization is effected, with the result that only the part of the semiconductor region on the surface of the electrically conductive substrate which corresponds to the drift region can be made porous by anodization. Also, in the case of that the mask has a cross section of a mesh with openings in the shape of a minute circle is arranged on the area on which the heat radiation region is to be formed on the semiconductor region and then, the anodization is effected, only the part of the semiconductor region on the surface of the electrically conductive substrate which corresponds to the drift region can be made porous by anodization.

Where said anodization is effected, 3) the magnetic field is applied to the electrically conductive substrate during the anodization in such a manner that the rate making the semiconductor region porous in the vertical direction to the one surface of the electrically conductive substrate is much faster than that in the other directions, with the result that the anisotropy in the rate of making the semiconductor region porous is enhanced. That is, in the region which is to be a drift region by oxidation after making porous, the anisotropy in the forming rate of the porous layer during the anodization is enhanced. Therefore, the controllability in the shape in the horizontal direction and in the direction of thickness of the drift region can be enhanced, with the result that the minute patterns of the drift region and the heat radiation region can be formed with a good controllability in the direction of thickness.

BRIEF DESCRIPTION OF THE DRAWINGS

These and other objects and features of the present invention will become clear from the following description taken in conjunction with the preferred embodiments thereof and the accompanying drawings throughout which like parts are designated by like reference numerals, and in which.

DETAILED DESCRIPTION OF THE PREFERRED EMBODIMENTS

First Embodiment

Figure 2:
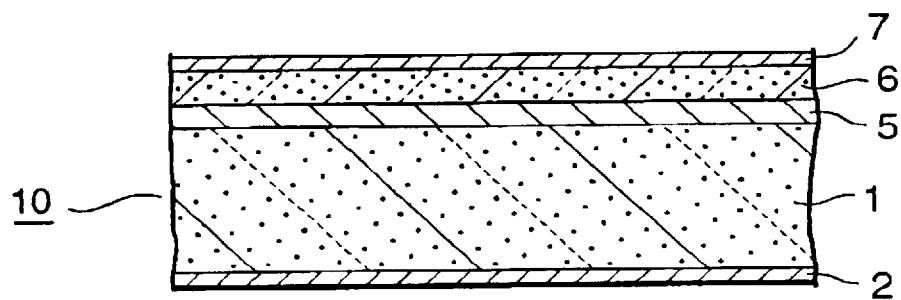
FIG. 2 is a cross sectional view showing the first embodiment of the present invention.

FIG. 2 is a schematic diagram showing the configuration of a field emission electron source 10 according to this embodiment, FIGS. 3A to 3D are cross sectional views of major steps of producing the field emission electron source 10. In this embodiment, an n-type silicon substrate 1 ((100)-substrate having a resistivity of about 0.1 Ωcm) is used for an electrically conductive substrate.

As shown in FIG. 2, the field emission electron source 10 according to this embodiment includes a polysilicon layer 5 oxidized by the rapid thermal oxidation technique on the principal surface of the n-type silicon substrate, a porous polysilicon layer 6 oxidized by the rapid thermal oxidation technique on the polysilicon layer 5 and a gold thin film, which is a thin metal film, formed on the porous polysilicon layer 6. And an ohmic electrode 2 is formed on the back surface of the n-type silicon substrate 1.

In this embodiment, a n-type silicon substrate 1 is used as an electrically conductive substrate. The electrically conductive substrate forms a negative electrode of the field emission electron source 10 and supports said porous polysilicon layer 6 in vacuum. Further, when voltage is applied to the electrically conductive substrate, the electrons are injected to the porous polysilicon layer.

And said porous polysilicon layer 6 acts as a strong electric field drift layer where the electrons injected from the electrically conductive substrate are drifted when voltage is applied between the electrically conductive substrate and the thin metal film.

A method of making the field emission electron source will be described below with reference to FIG. 3.

Figure 3A:
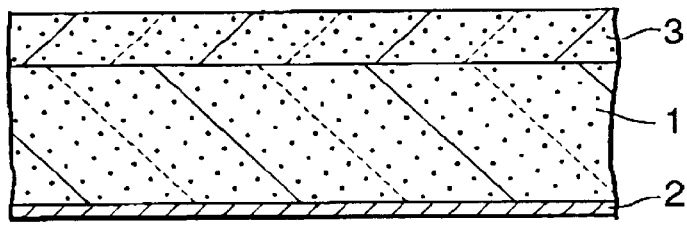
FIGS. 3A, 3B, 3C and 3D are cross sectional views showing major steps for explaining the production process of the field emission electron source of the first embodiment.

First the ohmic electrode 2 is formed on a back surface of the n-type silicon substrate 1, and then an undoped polysilicon layer 3 of about 1.5 μm in thickness is formed on a front surface of the n-type silicon substrate 1 opposite to the back surface, thereby to obtain a structure as shown in FIG. 3A. The polysilicon layer 3 is formed by the use of LPCVD process, using a vacuum of 20 Pa, a substrate temperature of 640° C., and a floating silane gas at 600 sccm.

Figure 3B:
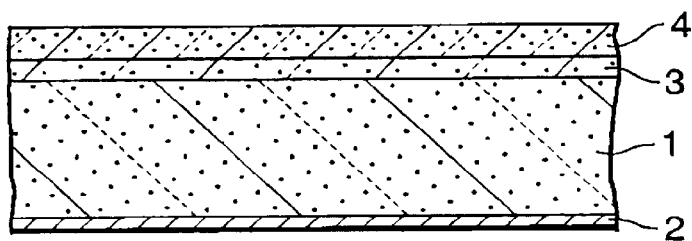

After the undoped polysilicon layer 3 is formed, the polysilicon layer 3 is subjected to anodization with a constant current while being irradiated with light. During this anodization, a liquid electrolyte made by mixing a 55 wt % aqueous solution of hydrogen fluoride and ethanol in a proportion of about 1:1 is used and a platinum electrode (not shown) is used as a negative electrode and the n-type silicon substrate 1 (ohmic electrode 2) is used as a positive electrode. By this anodization, a porous polysilicon layer 4 (hereinafter referred to as PPS layer 4) can be obtained as shown in FIG. 3B. In this embodiment, the anodization process was conducted under conditions of a constant current density of 10 mA/cm² and duration of anodization being 30 seconds, while irradiating the surface of the polysilicon layer 3 with light by means of a 500W tungsten lamp during the process of anodization. As a result, the porous polysilicon layer 4 of about 1 μm in thickness was formed in this embodiment. While a part of the polysilicon layer 3 is made porous in this embodiment, the entire polysilicon layer 3 may be made porous.

Figure 3C:
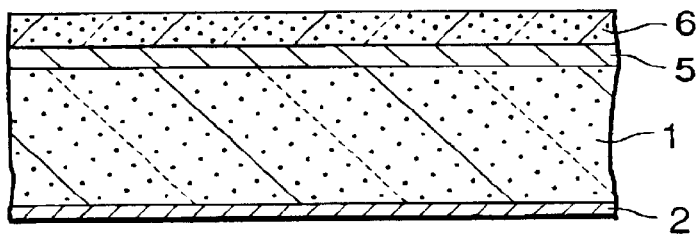

Then, by effecting the rapid thermal oxidation (RTC) to the PPS layer 4 and the polysilicon layer 3, a structure shown in FIG. 3C is obtained. Reference numeral 5 in FIG. 3C denotes a part of the polysilicon layer processed by the rapid thermal oxidation and reference numeral 6 denotes a part of the PPS layer processed by the rapid thermal oxidation (hereinafter referred to as RTO-PPS layer 6). The rapid thermal oxidation process was conducted at an oxidation temperature of 900° C. for the oxidation period of one hour. In this embodiment, since the PPS layer 4 and polysilicon layer 3 are oxidized by the rapid thermal oxidation, the layers can be heated up to the oxidation temperature in several seconds, thus making it possible to suppress entrainment oxidation taking place when charging into a furnace in case the conventional oxidation apparatus of furnace tube type is used.

Figure 3D:
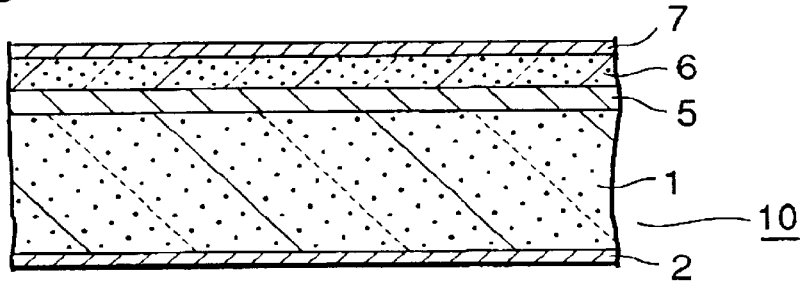

Then the thin gold film 7, which is a metal thin film, is formed on the RTO-PPS layer 6 by, for example, evaporation, thereby to obtain the field emission electron source 10 having a structure shown in FIGS. 3D and 2. While the thickness of the thin gold film 7 is about 10 nm in this embodiment, the thickness is not limited to a particular value. The field emission electron source 10 forms a diode with the thin gold film 7 serving as a positive electrode (anode) and the ohmic electrode 2 serving as a negative electrode (cathode). While the thin metal film is formed by evaporation in this embodiment, the method of forming the thin metal film is not limited to evaporation and the thin metal film may be formed by sputtering.

Now characteristics of the field emission electron source 10 of this embodiment will be described below.

Figure 4:
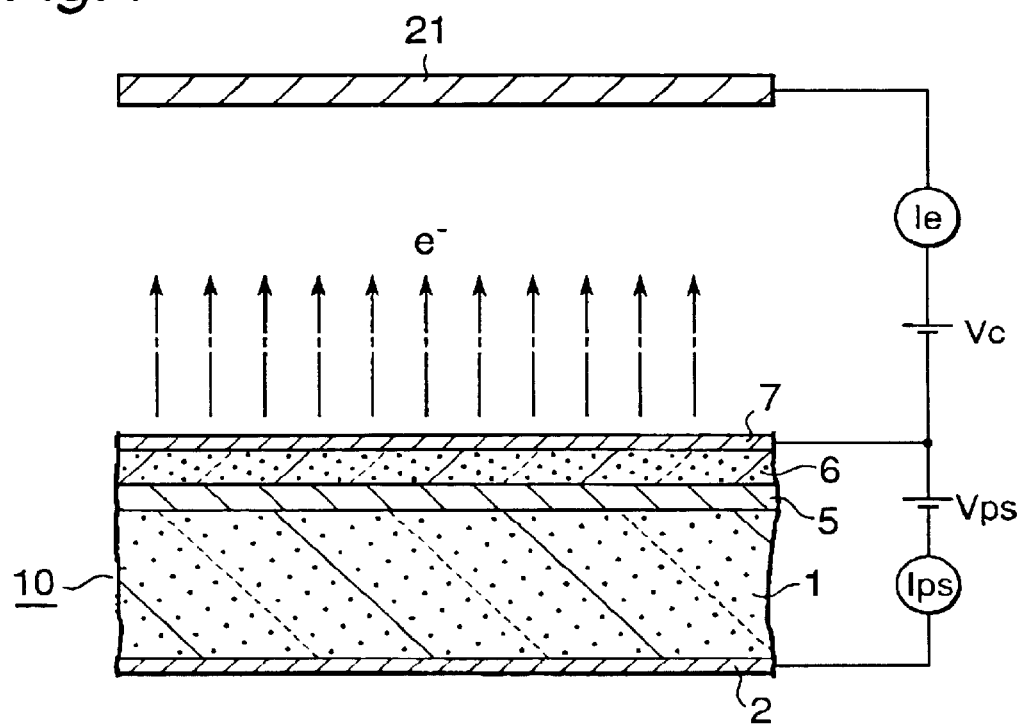
FIG. 4 is a schematic diagram for explaining the measuring principle of emitted electrons of the field emission electron source of the first embodiment.

The field emission electron source 10 is housed in a vacuum chamber (not shown) and a collector electrode 21 (collector for emitted electrons) is disposed at a position so as to confront the thin gold film 7 as shown in FIG. 4. Inside of the vacuum chamber is evacuated to a degree of about $5 \times 10^{-5}$ Pa. A DC voltage Vps is applied with the thin gold film 7 at a positive polarity with respect to the ohmic electrode 2 (i.e. n-type silicon substrate 1), and a DC voltage Vc is applied with the collector electrode 21 at a positive polarity with respect to the thin gold film 7. Measurements of the diode current Ips flowing between the thin gold film 7 and the ohmic electrode 2, and the electron emission current Ie flowing between the collector electrode 21 and the thin gold film 7 due to the emission of electrons e−from the field emission electron source 10 through the thin gold film 7 (alternate dash and dot line in FIG. 4 represents the emitted electron current) are shown in FIG. 5.

Figure 5:
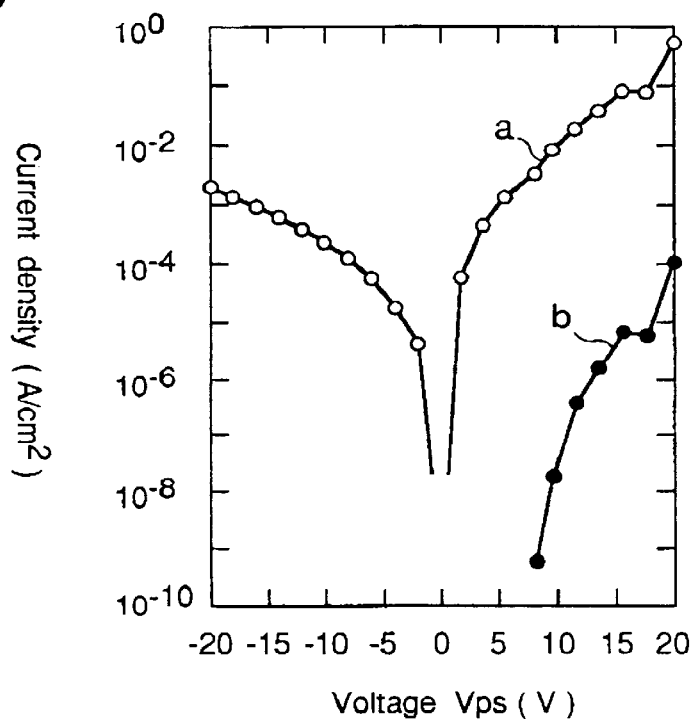
FIG. 5 is a graph showing a voltage-current characteristic of the field emission electron source of the first embodiment.

In FIG. 5, the DC voltage Vps is plotted along the horizontal axis and the current density is plotted along the vertical axis. Curve A in the drawing represents the diode current Ips and curve B represents the electron emission current Ie. The DC voltage Vc is set constant at 100V.

As will be seen from FIG. 5, the electron emission current Ie was observed only when the DC voltage Vps was positive, while both the diode current Ips and the electron emission current Ie were increased as the DC voltage Vps was increased. Specifically, when the DC voltage Vps was 15 V, current density of the diode current Ips was about 100 mA/cm$^2$ and the current density of the electron emission current Ie was about 10 $\mu$A/cm$^2$. This value of the electron emission current Ie was greater than that obtained with a field emission electron source using the porous silicon layer formed by making the surface of a single crystal silicon substrate porous as a strong electric field drift layer, described previously in conjunction with the prior art. According to the "Electronic Information & Telecommunications Association ED96–141, pp41–46", they described about 40 mA/cm$^2$ for the current density of the diode current Ips and 1 $\mu$A/cm$^2$ for the current density of the electron emission current Ie when the DC voltage Vps was 15 V. Thus, this embodiment of the present invention is effective to provide the field emission electron source exhibiting a high efficiency of electron emission.

Figure 6:
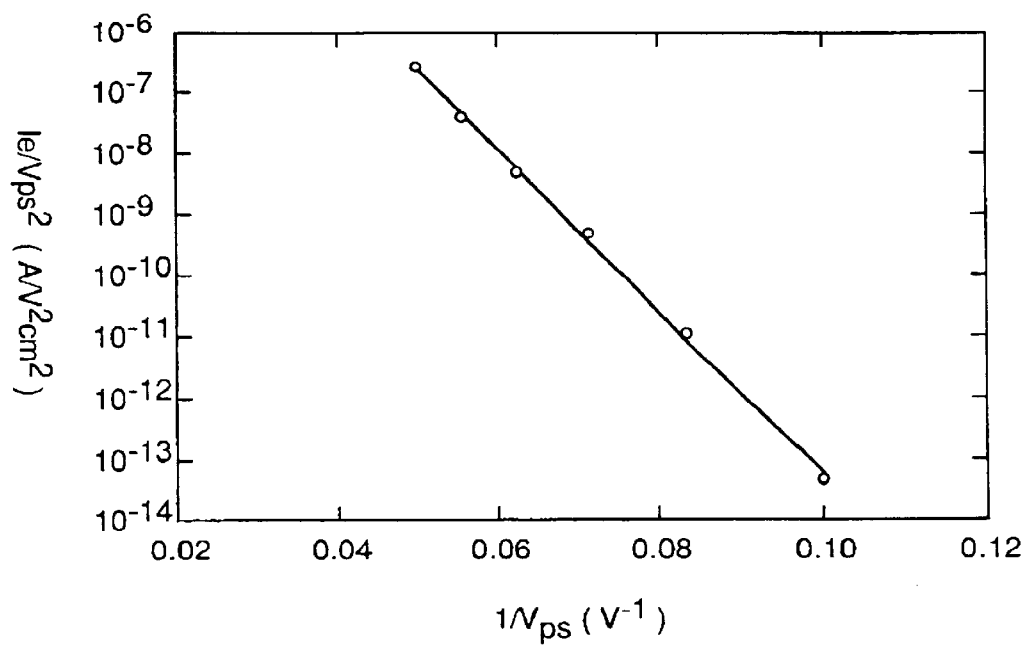
FIG. 6 is a graph of Fowlev-Nordheim plot of the data of FIG. 5.

FIG. 6 shows Fowley-Nordheim plot of the electron emission current Ie versus DC voltage Vps. The tact that the plots lie on a straight line indicates that the electron emission current Ie caused by the emission of electrons is due to the well-known quantum tunneling effect.

Figure 7:
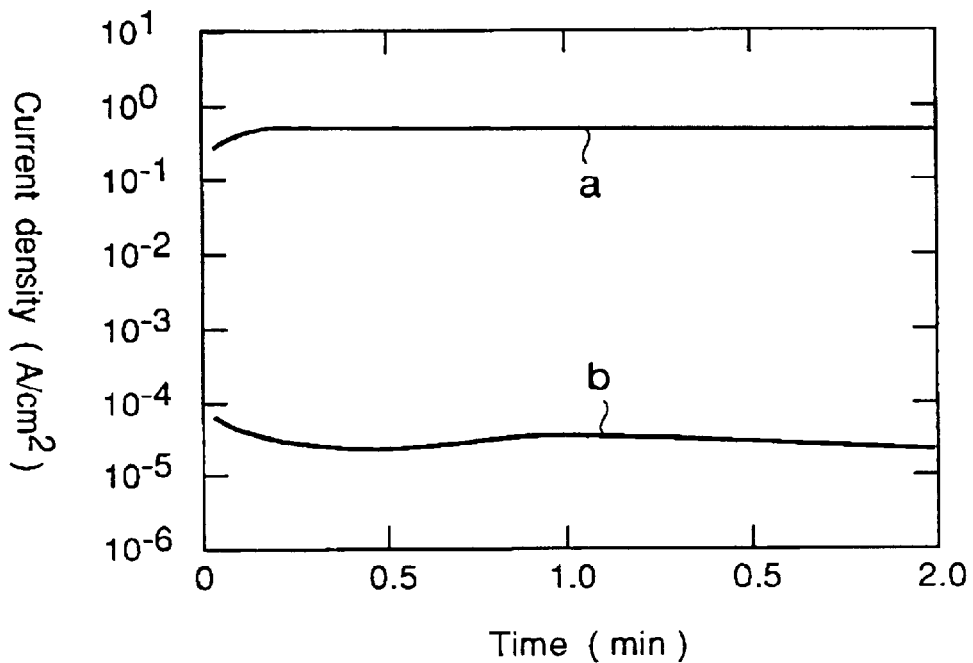
FIG. 7 is a graph showing a change in current with time in the first embodiment.

FIG. 7 is a graph showing the diode current Ips and the electron emission current Ie of the field emission electron source 10 of this embodiment with change in time. Time is plotted along the horizontal axis and the current density is plotted along the vertical axis, while curve A shows the diode current Ips and curve B shows the electron emission current Ie. Shown in FIG. 7 is the result obtained by setting the DC voltage Vps constant at 15 V and the DC voltage Vc constant at 100 V. As will be seen from FIG. 7, any popping phenomenon is not observed in both the diode current Ips and the electron emission current Ie with the field emission electron source 10 of this embodiment, so that the diode current Ips and the electron emission current Ie can be maintained substantially constant with time.

Such a characteristic of stable electron emission current Ie with less chronic change achieved by employing the configuration of the present invention cannot be achieved with the conventional field emission electron source based on the MIM system or single-crystal silicon substrate of which surface is made porous.

Figure 8:
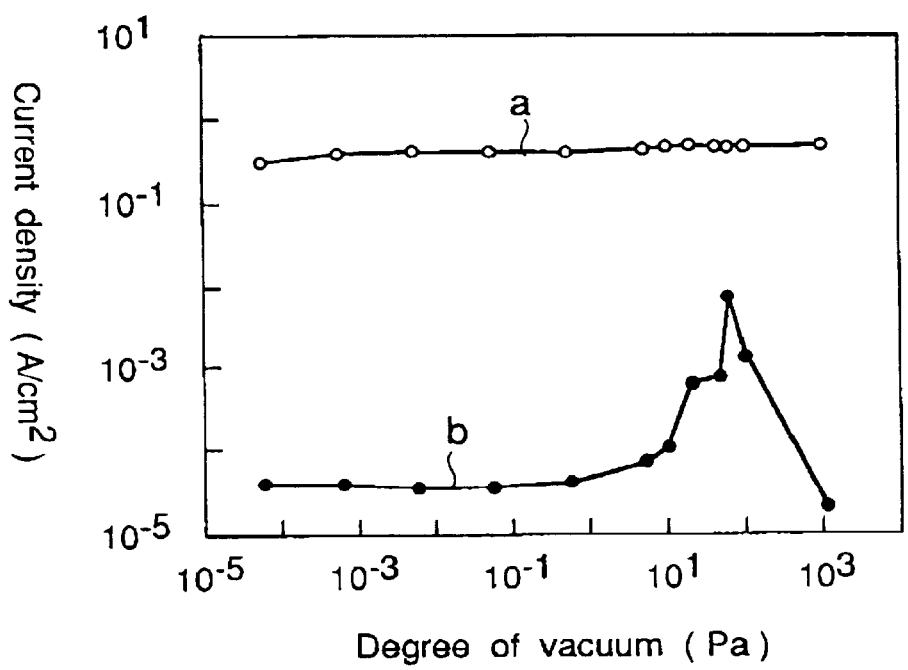
FIG. 8 is a graph showing dependency of the current density on the degree of vacuum in the first embodiment.

Now the dependency on the degree of vacuum of the electron emission current Ie of the field emission electron source 10 of this embodiment will be described below. FIG. 8 shows the diode current Ips and the electron emission current Ie changing as a function of the degree of vacuum of the argon atmosphere which surrounds the field emission electron source 10 of this embodiment. In FIG. 8, the degree of vacuum is plotted along the horizontal axis and the current density is plotted along the vertical axis. Curve A in the drawing represents the diode current Ips and curve B represents the electron emission current Ie. FIG. 8 shows that a substantially constant electron emission current Ie can be obtained in a range of degrees of vacuum from $10^{-4}$ Pa to about 1 Pa, indicating an insignificant dependence of the electron emission current Ie on the degree of vacuum. Thus, because of the low dependency on the degree of vacuum of the electron emission current Ie of the field emission electron source 10 of this embodiment, stable emission of electrons of high efficiency can be maintained even when the degree of vacuum changes to some extent. Thus, because the satisfactory electron emission characteristic can be achieved even with a low degree of vacuum, it is not necessary to use the field emission electron source under a high degree of vacuum, and it is made possible to produce an apparatus which uses the field emission electron source 10 at a lower cost with handling thereof made easier.

Next, the mechanism of the electron emission in the field emission electron source according to this embodiment of the present invention will be described below.

First, in order to study the mechanism of the electron emission, when the cross section of the PPS layer 4 of the specimen shown in FIG. 3B after anodization was observed with a transmission type electron microscope (TEM), it was confirmed that the micro-crystal silicon layer having nano-structures (about 5 nm in the diameter) was grown around the columnar polysilicon. And when the cross section of the specimen shown in FIG. 3A after forming the polysilicon layer 3 was observed with a TEM, it was confirmed that the polysilicon layer 3 was composed of aggregates (columnar structure) of the fine columnar grains (crystal grain) oriented in the direction of the film growth (in the vertical direction in FIG. 3A). With comparison of these observation results with TEM, it is assumed that anodization of the polysilicon layer 3 progresses faster at the boundary of the grain, that is, anodization progresses in the direction of thickness between the columns of the columnar structure and the columnar silicon grain structure remains after anodization. This is because the rate of the formation of the porous layer (PPS layer 4) is faster than that in the case that the porous silicon layer is formed by anodizing the single-crystal silicon substrate and the space density of the micro-crystal silicon layer having nano-structures where the quantum confinement effect is developed is reduced, while the relatively large columnar grains remain. In this case, judging from the control of electric conductivity and the structural and heat stability, because the columnar grain structure remains, the porous poly-crystal silicon formed by anodizing the poly-bilicon layer in the columnar structure seems to have better properties than those of the porous poly-crystal silicon formed by anodizing the bulk polysilicon layer.

Figure 1:
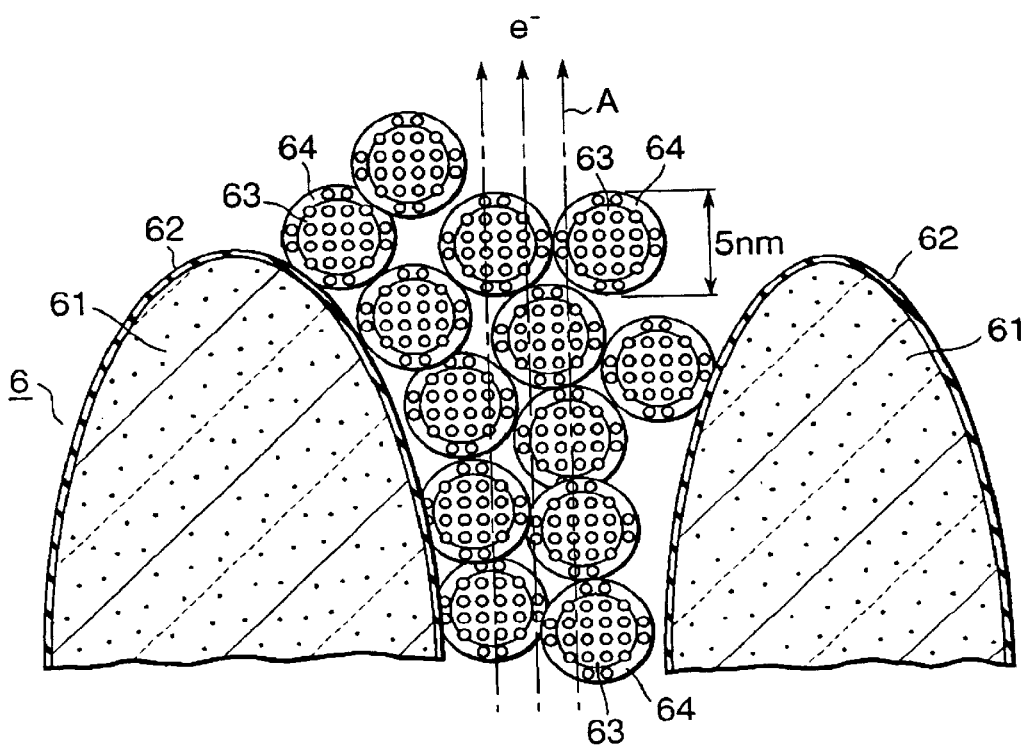
FIG. 1 is a schematic diagram for explaining the principle of mechanism of electron emission in the filed emission electron source according to the present invention.

From the above-mentioned results of TEM observation, the porous polysilicon layer 6 (RTO:PPS layer 6) oxidized by a rapid thermal oxidation as shown in FIG. 3D, that is, the strong electric field drift layer is supposed to comprise at least, a polysilicon 61 which is columnar semiconductor crystal, a thin silicon oxide film 62 formed on the polysilicon 61, a micro-crystal silicon layer 63 which is a semiconductor micro-crystal intervened between the columnar polysilicon 61, and a silicon oxide film 64 which is formed on the surface of the micro-crystal silicon layer 63 and is an insulating film having a thickness smaller than the crystal grain size of said micro-crystal silicon layer 63, as shown in FIG. 1.

Therefore, in the field emission electron source 10 according to this embodiment, the electrons seem to be emitted in the following mechanism. When the DC voltage Vps, applied to the thin gold film 7 which is of a positive polarity with respect to the n-type silicon substrate 1, reaches a predetermined threshold value, electrons e are injected,from the n-type silicon substrate 1 into the RTO-PPS layer 6 by thermal excitation. At this time, since most of electric field applied to the RTO-PPS layer 6 is applied across the silicon oxide layer 64, the injected electrons e& are accelerated by the strong electric field applied across the silicon oxide layer 64 and are drifted through the space between the polysilicon 61 in the.RTO-PPS layer 6 toward the surface in the direction of the arrow A in FIG. 1 (upward in FIG. 1). In this case, the drift length of the electrons in the RTO-PPS layer is very long as compared with the grain size of the micro-crystal silicon layer 63 as described below, the electrons reach the surface of the RTO-PPS layer 6 with almost no collision. The electrons e which have reached the surface of the RTO-PPS layer 6 are hot electrons having a kinetic energy much higher by several kT or much more than that in the state of thermal equilibrium and easily penetrate the thin gold film 7 through the oxide layer at the top surface of the RTO-PPS layer 6 due to tunneling, thereby to be emitted to into the vacuum.

In the field emission electron source 10 of this embodiment, as described above with reference to FIG. 7, the electrons can be emitted without the occurrence of the popping noise and with a high efficiency and a high stability This is because it is supposed that the surface of each grain in the RTO-PPS layer is made porous but the core of each grain (polysilicon 61 in FIG. 1) retains a crystal state and it is also supposed that heat generated by applying voltage transmits along the crystal (polysilicon 61 in FIG. 1) and radiates to the outside, therefore temperature rise of RTO-PPS layer being suppressed.

Based on the discussion above, it is supposed that the RTO-PPS layer 6, which is a strong electric field drift layer, has a semi-insulating characteristic to make a strong electric field lie. And it is supposed that in the RTO-PPS layer 6, the electron scattering is small and the drift length is long, the heat conductivity being high enough to suppress the thermorunaway of the diode current Ips. Therefore, it is made possible to achieve stable electron emission with high efficiency.

The facts that support the mechanism of the electron emission due to the tunneling effect of the hot electrons as described above will be described. Such facts are 1. Strong electric field effect at the surface, 2. Drift length of the electron, and 3. Energy distribution of the emitted electrons.

1. Strong Electric Field Effect at the Surface

In the diode formed by using porous silicon obtained by anodizing the n-type single-crystal silicon substrate as described in the conventional example (hereinafter, referred to as a porous silicon diode), an electroluminescence (hereinafter, referred to as EL) light emission is first observed in the low voltage range which is insufficient for cold electron emission. In this light emission mechanism, it is important how the holes with which electrons recombine generate. Judging from the analysis of the EL light emission characteristics, the two process, the tunneling of the electron from the valence band of the micro-crystal silicon layer into the neighboring conduction band thereof and the electron avalanche due to impact ionizaion, are proposed for the generation mechanism of holes (T. Oguro et al, J. AppL Phys. 81 (1997) 1407–1412).

These two processes require the strong electric field. Judging from the estimation based on the measurement of the dependency on the excitation wavelength of PL quenching due to the applied electric field, the strong electric field having an intensity of about $10^6$ V/cm lies in the relatively shallow area from the surface of the porous silicon layer to the depth of several hundred nm in the porous silicon diode during the EL light emission. Since the electron emission requires an applied voltage much higher than that required for the EL, it is supposed that the hot electrons are concerned with the electron emission.

On the contrary, in this embodiment, since the oxide layer is formed particularly intensively on the surface of the RTO-PPS layer by a RTO process, like the case of the porous layer, the strong electric field generated in the vicinity of the surface causes the generation of the hot electrons and the electron emission due to tunneling.

2. Drift Length of the Electron

Based on the measurement results of the time-of-flight of carriers which is related to a photoconductive effect of the porous silicon layer, it was reported that the drift length of the carriers in the porous silicon layer was as long as about 1 $\mu$m under a strong electric field ($10^5$ V/cm) (R. Sedlacik et al, Thin Solid Films 255(1993) 269–271).

This value is much larger than the size of the micro-crystal silicon layer in the porous silicon layer and it means that the conductive electrons can be made easily to be hot electrons. That is, what controls the conduction of electrons in the porous silicon layer is not only the single-crystal silicon structure itself, but also the surface layer of the micro-crystal silicon layer and the interfacial structure such as a thin silicon oxide film between the micro-crystal silicon layers where a strong electric field lies.

These fact are applicable to the RTO-PPS layer 6 in this embodiment. In the case that an electric field having the similar intensity lies, it is supposed easily that the drift length of the electrons is sufficiently long as compared with the grain size of the polysilicon 61 (200 nm to 300 nm in this embodiment) and the electrons reaching the surface turn into hot electrons.

3. Energy Distribution of Emitted Electrons

Figure 9:
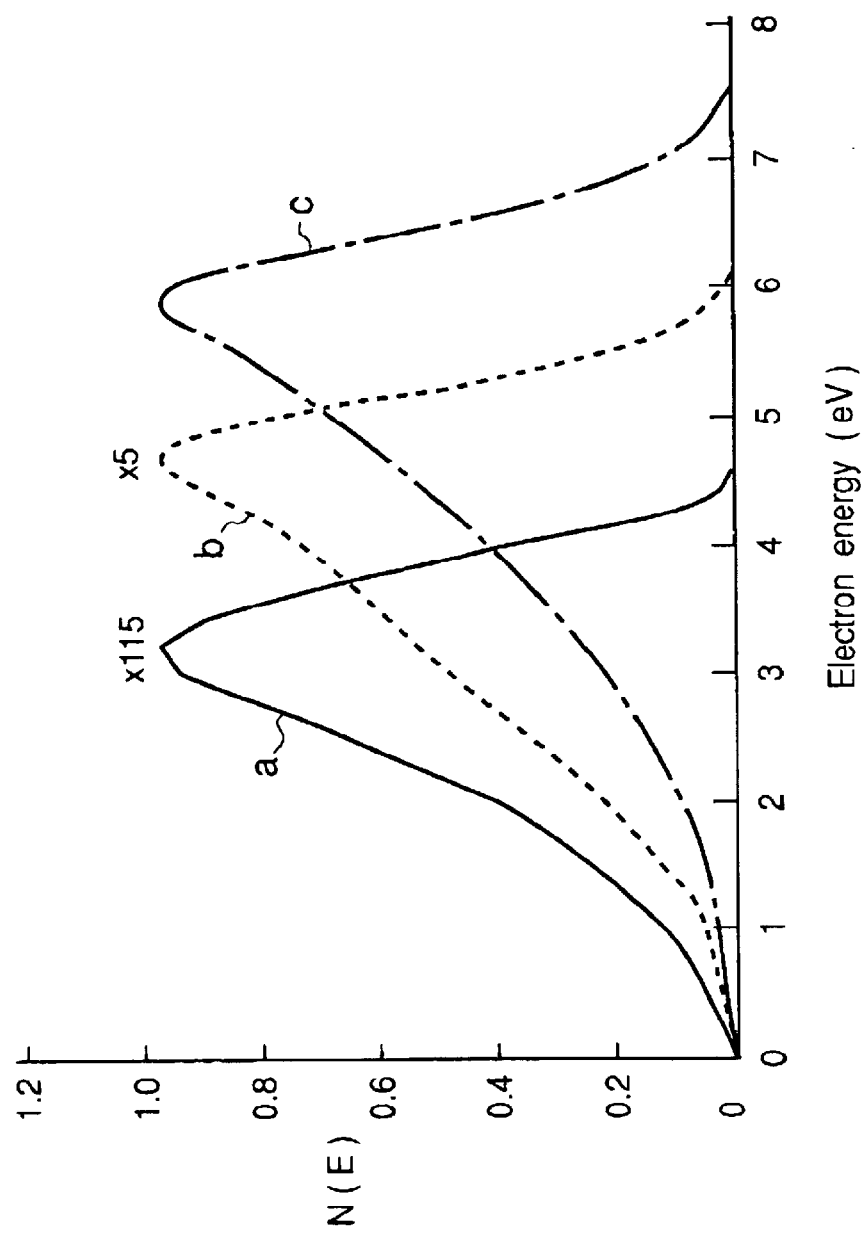
FIG. 9 is a schematic diagram for explaining the energy distribution of the emitted electrons in the first embodiment.

Distribution of energy N(E) of electrons emitted from the field emission electron source 10 of this embodiment was measured and the result is shown in FIG. 9. In FIG. 9, curve A shows the distribution when DC voltage Vps is 12V, curve B shows the distribution when the DC voltage Vps is 15V and curve c shows the distribution when the DC voltage Vps is 18V.

From FIG. 9, it is found that the distribution of energy N(E) of electrons is relatively broad and, moreover, includes high-energy components of several electron volts, while the peak energy shifts toward higher energy as the DC voltage Vps applied increases. Therefore it is supposed that there occurs less scattering of electrons in the RTO-PPS layer 6, and that the electrons which have reached the surface of the RTO-PPS layer 6 are hot electrons having sufficient energy. That is, it supposed that the quasi-ballistic electron emission phenomenon occurs.

The fact electrons having reached the surface are not subject to such a strong scattering that causes relaxation to the thermal equilibrium means less energy loss, i.e. heat generation in the RTO-PPS layer 6 and the diode current Ips can be maintained constant. Moreover, the columnar polysilicon 61 remaining in the RTO-PPS layer 6 (see FIG. 1) contributes to the heat diffusion, so that the popping noise is suppressed.

In this embodiment, the polysilicon layer 3 having a columnar structure deposited on the n-type silicon substrate 1 is anodized, but as long as the structure shown in FIG. 1 is obtained finally, the bulk polysilicon Layer may be deposited and be anodized. Also, instead of the deposition of the polysilicon layer 3, the n-type substrate may be microtreated into the columnar structure from the principal surface down to a predetermined depth on the surface side and then anodized.

While the n-type silicon substrate 1 ((100) substrate having a resistivity of about 0.1 Ωcm) is used for the electrically conductive substrate in this embodiment, the electrically conductive substrate is not limited to the n-type silicon substrate and, for example, a metal substrate such as a chromium substrate, or a glass substrate with a conductive thin film such as an electrically conductive transparent thin film of, for example, indium tin oxide (ITO), platinum or chromium conductive film formed thereon may be used, in which case it is made possible to achieve larger emission area and lower production cost than in the case of using a semiconductor substrate such as n-type silicon substrate.

Where the conductive substrate is a semiconductor substrate, the polysilicon layer 3 may be formed on the conductive substrate by the use of LPCVD (Low Pressure Chemical Vapor Deposition) process, sputtering process or so on. Also the polysilicon layer may be formed by annealing an amorphous silicon layer formed On a conductive substrate by plasma-CVD process and crystalizing said layer. Where the conductive substrate is the combination of the glass substrate and the conductive thin film, the polysilicon layer 3 may be formed on the conductive thin film by annealing with an excimer laser to an amorphous silicon layer formed on the conductive thin film by CVD process. It is not limited to CVD process, the polysilicon layer 3 may be formed by CGS (Continuous Grain Silicon) process, catalytic CVD process, or so on. Where the polysilicon layer 3 is deposited on the substrate by CVD process or so on, the polysilicon layer to be deposited is influenced extremely by the orientation of the substrate. Therefore, where the polysilicon layer 3 is deposited on the substrate other than the (100) single-crystal silicon substrate, such deposition conditions may be set that the polysilicon grows in the perpendicular direction to the principal surface In the above-mentioned embodiment, the PPS layer 4 and the polysilicon layer 3 are oxidized by a rapid thermal oxidation technique, but the oxidization is not limited to a rapid thermal oxidation, and chemical oxidation or oxygen plasma oxidation can be used. Instead of oxidation, nitriding can be used. In such a case, nitrogen plasma nitriding, thermal nitriding, or so on can be used. That is, a silicon nitride may employed as an insulating film, instead of the insulating film composed of a silicon oxide film 64 as shown in FIG. 1.

Also, in the above-mentioned embodiment, a gold thin film 7 is used as a thin metal film. However, the thin metal film is not limited to the gold thin film 7, and may be prepared from any suitable material as far as the work function of such suitable material is small. Aluminum, chrome, tungsten, nickel, platinum can be used therefor. The work function of gold is 5.10 eV, that of aluminum is 4.28 eV, that of chrome is 4.50 eV, that of tungsten is 4.55 eV, that of nickel is 5.15 eV, that of platinum is 5.65 eV.

Second Embodiment

Figure 10A:
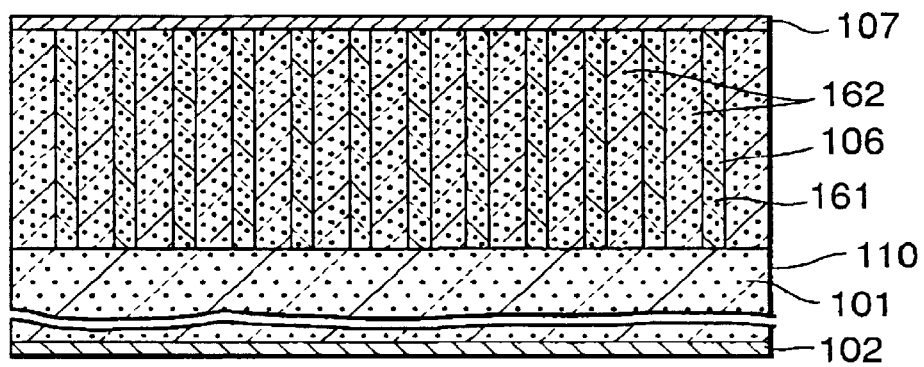
FIGS. 10A and 10B are a schematic vertical cross sectional view and a schematic transverse cross sectional view of the second embodiment, respectively.
Figure 10B:
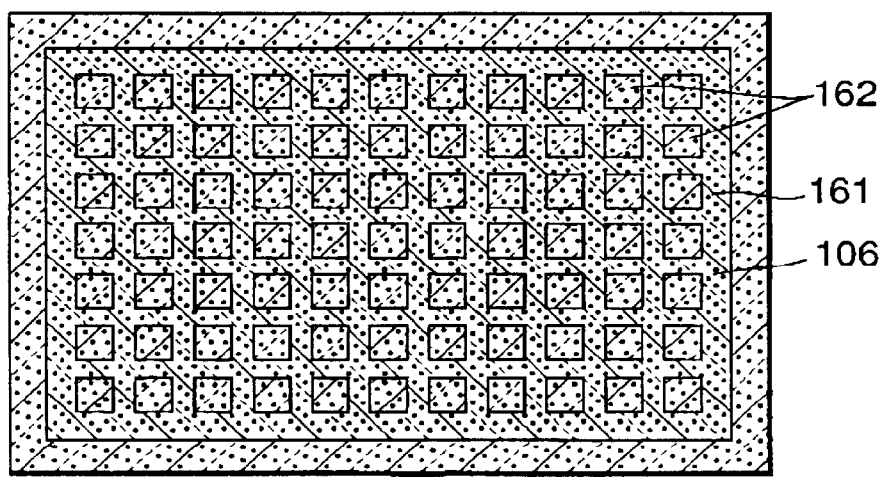
Figure 11A:
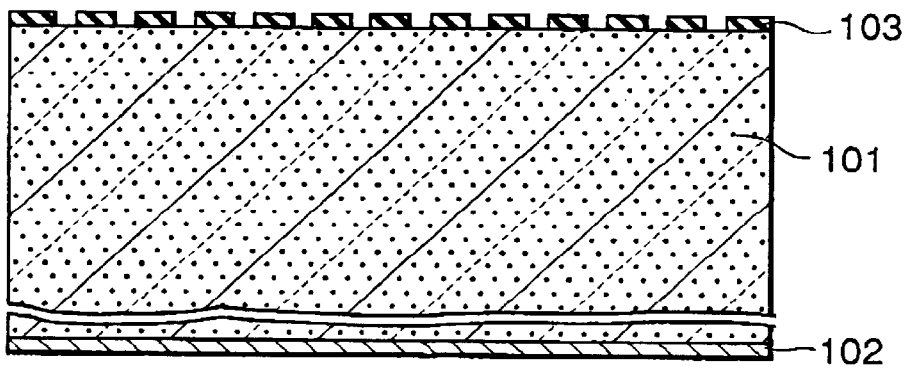
FIGS. 11A, 11B and 11C are cross sectional views showing major steps for explaining the production process of the second embodiment.
Figure 11B:
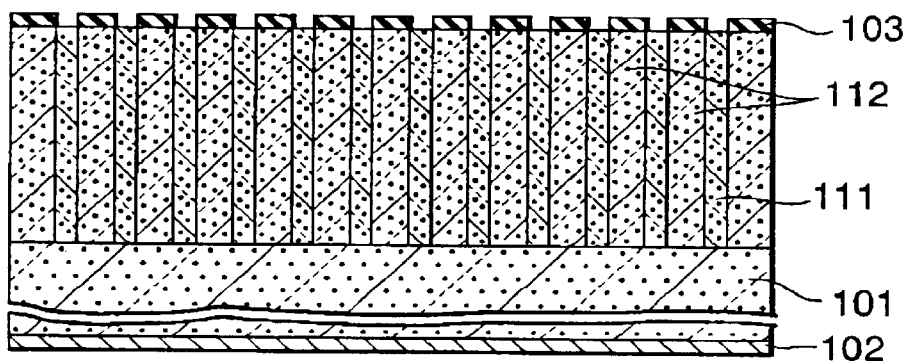
Figure 11C:
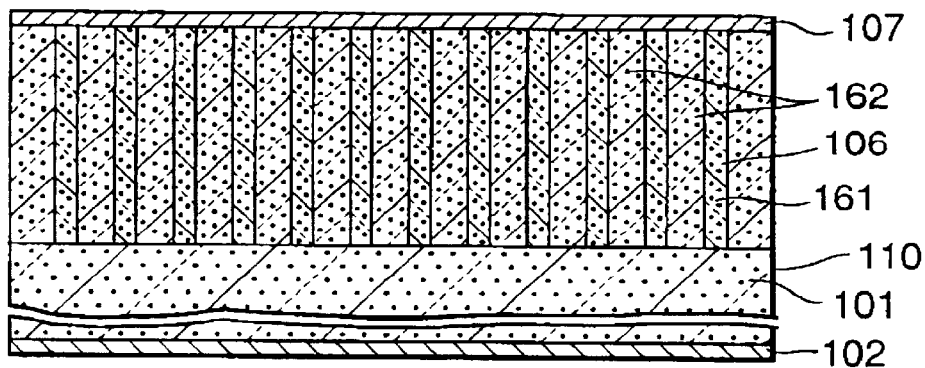

FIG. 10 is a schematic diagram showing the configuration of a field emission electron source 110 according to this embodiment, FIGS. 11A to 11C are cross sectional views of major steps of producing the field emission electron source 110. In this embodiment, an n-type silicon substrate 101 having a resistivity nearly similar to that of the conductor (for example, (100)-substrate having a resistivity of about 0.1 Ωcm) is used for an electrically conductive substrate.

As shown in FIG. 10, the field emission electron source 110 according to this embodiment includes a strong electric field drift part 106 formed on the principal surface side of the n-type silicon substrate 101 and a surface electrode 107 of a thin metal film which is formed on the strong electric field drift part 106. And an ohmic electrode 102 is formed on the back surface of the n-type silicon substrate 101.

For the field emission electron source 110 of this embodiment, the surface electrode 107 is disposed in the vacuum and a collector electrode (not shown) is disposed at a position so as to confront the thin metal film. When a DC voltage is applied with the surface electrode 107 at a positive polarity with respect to the ohmic electrode 102 and a DC voltage is applied with the collector electrode at a positive polarity with respect to the surface electrode 107, electrons injected from the n-type silicon substrate 101 into the strong electric field drift part 106 are drifted in the strong electric field drift part 106 and emitted through the surface electrode 107. In this case, the current flowing between the surface electrode 107 and the ohmic electrode 102 is called the diode current and the current flowing between the collector electrode and the surface electrode 107 is called the electron emission current. The efficiency of electron emission increase as the ratio of the electron emission current to the diode current increases. The electrons can be emitted with the field emission electron source 110, even when a DC voltage of as low as about 10 to 20 V is applied between the surface electrode 107 and the ohmic electrode 102.

The strong electric field drift part 106 according to the present embodiment comprises a drift region 161 of which the cross section at the right angles to the direction of thickness of the n-type silicon substrate 101, an electrically conductive substrate, is in the structure of mesh and in which the electrons are drifted, and a heat radiation region 162 which is filled in the crystals like openingsof the mesh-like drift region and which has a heat conductivity higher than that of the drift region 161. That is, the heat radiation region 162 is formed in the pillared structure in the parallel direction to the direction of thickness of the n-type silicon substrate 101. In this case, the drift region 161 is made of oxidized porous silicon and the heat radiation region 162 is made of oxidized single-crystal silicon.

Thus, in the field emission electron source 110 of this embodiment, because heat generated in the drift region 161 is radiated through the heat radiation region 162, the popping phenomenon is not observed during the electron emission and the stable electron emission can be achieved with a high efficiency.

A method of making the field emission electron source will be described below with reference to FIG. 11.

Figure 12:
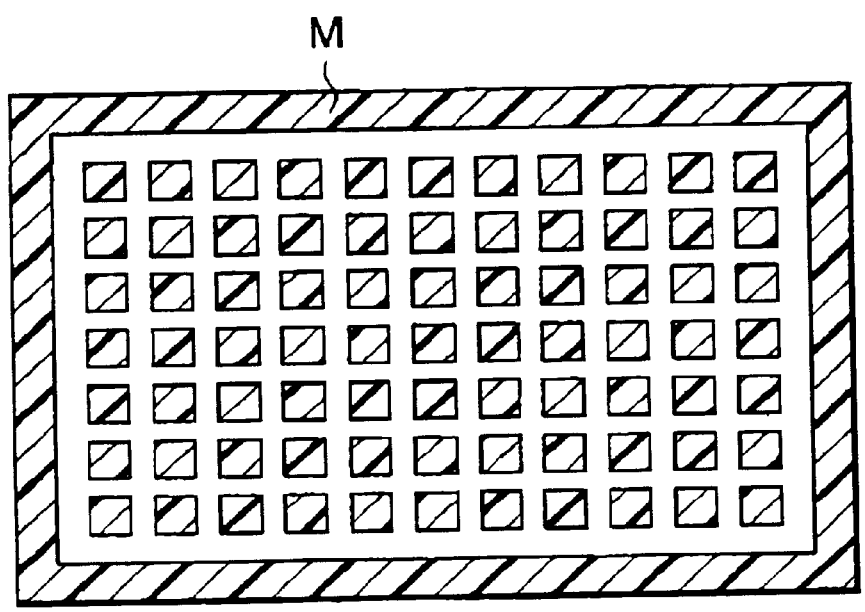
FIG. 12 is a plan view of a photo-mask for explaining the production process of the second embodiment.

First the ohmic electrode 102 is formed on a back surface of the r-type silicon substrate 101, and then photoresist is applied to the principal surface of the n-type silicon substrate 101. Said photoresist is patterned with a photomask A shown in FIG. 13 to form a resist mask 103, resulting in the structure as shown in FIG. 12A. The photomask M is constructed in such a structure that the plane shape of the resist mask 103 is a generally minute square (for example, in the order of 0.1 μm). The photonask M may be constructed in such a structure that the plane shape of the resist mask 103 is a minute polygon, minute circle, minute star and the like other than a square.

Then the n-type silicon substrate 101 on the principal surface side thereof is subjected to anodization with a constant current while being irradiated with light. During this anodization, a liquid electrolyte made by mixing a 55 wt % aqueous solution of hydrogen fluoride and ethanol in a proportion of about 1:1 is used and a platinum electrode (not shown) is used as a negative electrode and the n-type silicon substrate 101 (ohmic electrode 102) is used as a positive electrode. By this anodization, the region which is not covered with resist mask 103 on the principal surface side of the n-type silicon substrate 101 is made porous and a porous layer ill made of porous silicon is formed, resulting in the structure as shown in FIG. 11B. In FIG. 11B, reference numeral 112 designates a semiconductor layer composed of a part of the n-type silicon substrate 101. The semiconductor layer 112 is in the structure of a square pole. In this embodiment, the anodization process was conducted under conditions of a constant current density of 10 mA/cm$^2$ and duration of anodization being 30 seconds, while irradiating the principal surface of the n-type silicon substrate 101 with light by means of a 500W tungsten lamp during the process of anodization. These conditions are proposed as an example and are not limited thereto. In this embodiment, the region on the principal surface side of the n-type silicon substrate 101 also serves as a semiconductor region.

Then, by effecting the rapid thermal oxidation (RTO) to the porous layer 111 and the semiconductor layer 112, a strong electric field drift part 106 is formed. Thereafter, the surface electrode 107 made of a gold thin film is formed by, for example, deposition on the strong electric field drift part 106, resulting in the structure as shown in FIG. 11C. In FIG. 11C, reference numeral 161 designates a porous layer 111 oxidized by rapid thermal oxidation corresponding to the above-mentioned drift region 161 and reference numeral 162 designates a semiconductor layer 112 oxidized by rapid thermal oxidation corresponding to the above-mentioned heat radiation region 162. That is, the strong electric field drift part 106 is composed of the drift region 161 and the heat radiation region 162 in FIG. 11C. The rapid thermal oxidation process was conducted at an oxidation temperature of 900° C. for the oxidation period of one hour. While the thickness of the surface electrode 107 is about 10 nm in this embodiment, the thickness is not limited to a particular value. While the metal thin film (for example, thin gold film) serving as the surface electrode 107 is formed by evaporation in this embodiment, the method of forming the thin metal film is not limited to evaporation and the thin metal film may be formed by sputtering. The field emission electron source 110 forms a diode with the surface electrode 107 serving as a positive electrode (anode) and the ohmic electrode 102 serving as a negative electrode (cathode). The current which flows when a DC voltage is applied between the positive electrode and the negative electrode is diode current.

In the field emission electron source 110 produced by the above-mentioned process, less change of the electron emission current with change in time and no popping noise was observed and the electrons were emitted with a high stability and a high efficiency. In this field emission electron source 110, because the dependency of the electron emission characteristic (for example, electron emission current) on the degree of vacuum is low and the satisfactory electron emission characteristic can be achieved even with a low degree of vacuum, it is not necessary to use the field emission electron source under a high degree of vacuum, and it is made possible to produce an apparatus which uses the field emission electron source 110 at a lower cost with handling thereof made easier.

In the field emission electron source 110 of this embodiment, because the anodization is effected after the resist mask 103 is disposed on the semiconductor region of the n-type silicon substrate 101, the n-type silicon substrate 101 is made porous along the direction of thickness in the area which is exposed. Therefore, judging from the control of electric conductivity and the structural and heat stability, the strong electric field drift part 106 in the field emission electron source 110 of this embodiment is supposed to have a better characteristic than that of the strong electric field drift layer obtained by make the entire surface of the single-crystal silicon substrate on the principal surface side thereof porous, conventionally.

Therefore, in the field emission electron source 110 according to this embodiment, the electrons seem to be emitted in the following mechanism. When the DC voltage applied to the surface electrode 107 which is of a positive polarity with respect to the n-type silicon substrate 101 (ohmic electrode 2) reaches a predetermined threshold value, electrons are injected from the n-type silicon substrate 101 into the strong electric drift part 106 by thermal excitation. On the other hand, there are a large number of micro-crystal silicon layers having nano-structures where the quantum confinement effect occurs in the drift region 161 of the strong electric field drift part 106, and on the surface of the micro-crystal silicon layer, the silicon oxide film having a thickness smaller than that the crystal grain size of the micro-crystal silicon layer is formed. At this time, since most of electric field applied to the strong electric field drift part 106 is applied across the silicon oxide layer formed on the surface of the micro-crystal silicon layer, the injected electrons are accelerated by the strong electric field applied across the silicon oxide film and are drifted in the drift region 161 toward the surface. In this case, the drift length of the electrons is very long as compared with the grain size of the micro-crystal silicon layer, the electrons reach the surface of the drift region 161 with almost no collision The electrons which have reached the surface of the drift region 161 are hot electrons having a much higher kinetic energy several kT or much more higher than that in the state of thermal equilibrium and easily penetrate the surface electrode 107 through the oxide layer at the top surface of the drift part 106 due to tunneling, thereby to be emitted to into the vacuum.

In the field emission electron source 110 of this embodiment, the electrons can be emitted without the occurrence of the popping noise and with a high efficiency and a high stability. This is because it is supposed that heat generated in the drift region 161 of the strong electric field drift part 106 by applying voltage transmits along the heat radiation region 162 and radiates to the outside, thereby temperature rise being suppressed.

Based on the discussion above, it is supposed that the strong electric filed drift part 106 has a semi-insulating characteristic to make a strong electric field lie. And it is supposed that in the strong electric filed drift layer 106, the electron scattering is small and the drift length is long, the heat conductivity being high enough to suppress the thermorunaway of the diode current. Therefore, it is made possible to achieve stable electron emission with high efficiency.

The facts that support the mechanism of the electron emission due to the tunneling effect of the hot electrons are as described above. Such facts are 1. strong electric field effect at the surface and 2. Drift length of the electron.

Thus, based on the above-mentioned facts 1 and 2, it is supposed that the electrons are emitted due to tunneling of the hot electrons in the field emission electron source 110 of this embodiment.

In this embodiment, as described above, a part of the n-type silicon substrate 101 on the principal surface side thereof serves as a semiconductor region and this semiconductor region is anodized. However, any one of single-crystal silicon, poly-crystal silicon, amorphous silicon, single-crystal silicon carbide(SiC), poly-crystal silicon carbide or amorphous silicon carbide or so on may be laminated as a semiconductor region on the n-type silicon substrate and then anodization maybe effected. Also, the electrically conductive substrate is not limited to the n-type silicon substrate and, for example, a metal substrate such as a chromium substrate, or a glass substrate with a conductive thin film such as an electrically conductive transparent thin film of, for example, indium tin oxide (ITO), platinum or chromium conductive film formed thereon may be used, in which case it is made possible to achieve larger emission area and lower production cost than in the case of using a semiconductor substrate such as n-type silicon substrate. Where the conductive substrate is a semiconductor substrate, the polysilicon layer may be formed on the conductive substrate by the use of LPCVD process, sputtering process or so on. Also the polysilicon layer may be formed by annealing an amorphous silicon layer formed on a conductive substrate by plasma-CVD process and crystalizing said layer. Where the conductive substrate is the combination of the glass substrate and the conductive thin film, the polysilicoii layer may be formed on the conductive thin film by annealing with an excimer laser to an amorphous silicon layer formed on the conductive thin film by CVD process. It is not limited to CVD process, the polysilicon layer may be formed by CGS (Continuous Grain Silicon) process, catalytic CVD process, or so on. Where the polysilicon layer is deposited on the substrate by CVD process or so on, the polysilicon layer to be deposited is influenced extremely by the orientation of the substrate. Therefore, where the polysilicon layer is deposited on the substrate other than the (100) single-crystal silicon substrate, such deposition conditions may be set that the polysilicon grows in the perpendicular direction to the principal surface of the substrate.

In the above-mentioned embodiment, a gold thin film is used as a thin metal film to form a surface electrode. However, the thin metal film is not limited to the gold thin film, and may be prepared from any suitable material as far as the work function of such suitable material is small. Aluminum, chrome, tungsten, nickel, platinum can be used therefor.

When a part of the semiconductor region is made porous by anodization, such a magnetic field is applied to the n-type silicon substrate 101 that the rate of making the semiconductor region porous in the perpendicular direction to the principle surface of the n-type silicon substrate 101 which is an electrically conductive substrate is much faster than that in the other direction, with the result that the anisotropy in the rate of making porous is enhanced. Thus, because the anisotropy in the rate of forming the porous layer during anodization of the region which is to be a drift region 161 by above-mentioned rapid thermal oxidation is enhanced, the shape of the drift region 161 in the horizontal direction and in the direction of thickness can be controlled in a better manner and the minute pattern of heat radiation region 162 and the drift region 161 can be formed in the direction of thickness with a good controllability. In this case, to enhance the anisotropy, the magnetic field may be applied across the n-type silicon substrate 101 in the vertical direction.

Third Embodiment

Figure 13:
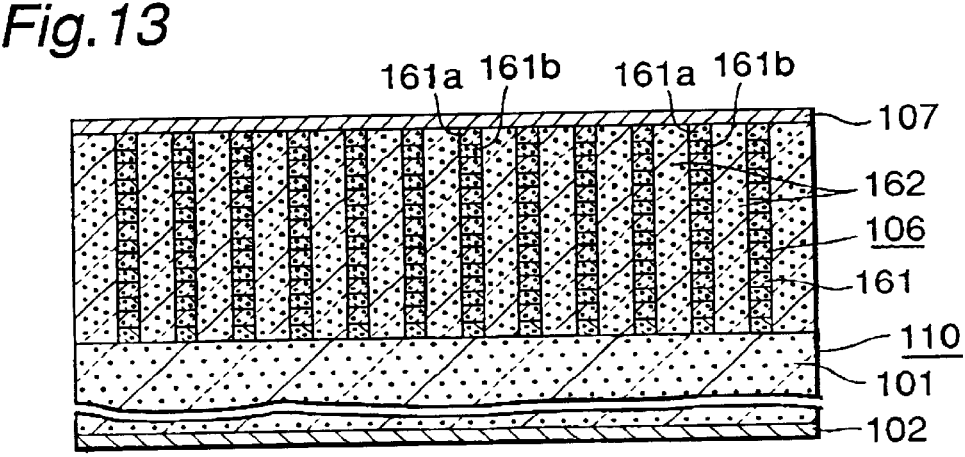
FIG. 13 is a schematic vertical cross sectional view showing the third embodiment.

The field emission electron source 110 of this embodiment has a configuration as shown in FIG. 13 and the basic configuration thereof is substantially similar to that of the second embodiment. Therefore, only the difference from the second embodiment will be described below for the sake of brevity.

The field emission electron source 110 of this embodiment is characterized by the structure of the drift region 161 in the strong electric field drift part 106 shown in FIG. 13. In this embodiment, the drift region 161 is in the laminated structure (multi-layered structure) made by alternately laminating a first drift layer 161b having a higher porosity and a second drift layer 161a having a lower porosity in such a manner that a second drift layer 161 having a lower porosity is formed on the front surface of the drift region 161. Components similar to those of the second embodiment will be denoted with the same reference numerals. The description thereof will be omitted.

Thus, since the field emission electron source 110 of this embodiment comprises a drift region 161 in the multi-layered structure as described above, the overflow of the diode current can be suppressed more effectively and the efficiency of the electron emission can be enhanced, compared with the field emission electron source of the first embodiment.

The process of producing the field emission electron source of this embodiment is almost the same as that in the second embodiment and only the conditions of anodization are different. That is, in this embodiment, anodization under the first condition with current density being small and anodization under the second condition with current density being large are repeated alternately. At the time when anodization under the first condition is completed one time, a porous layer having a low porosity is formed on the surface of the n-type silicon substrate. Then at the time when anodization under the second condition is completed, a porous layer having a high porosity is formed on one side of said porous layer having a low porosity adjacent the n-type silicon substrate 101.

Fourth Embodiment

Figure 14:
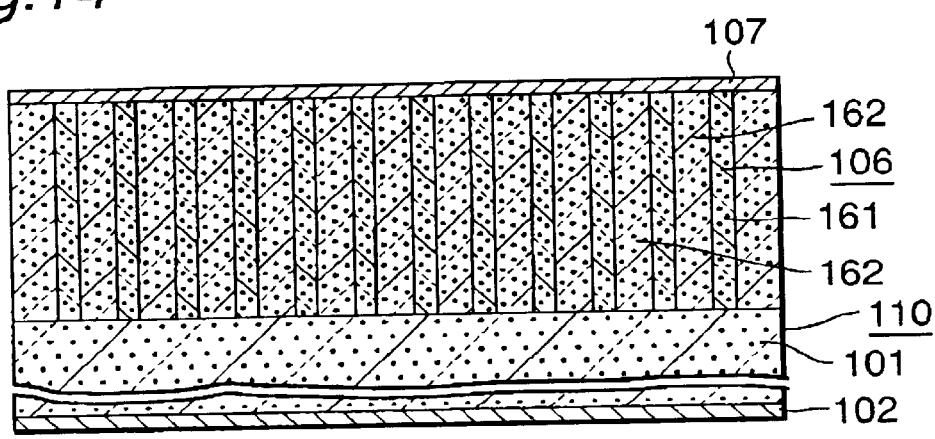
FIG. 14 is a schematic vertical cross sectional view showing the fourth embodiment.

The field emission electron source 110 of this embodiment has a configuration as shown in FIG. 14 and the basic configuration thereof is substantially similar to that of the second embodiment. Therefore, only the difference from the second embodiment will be described below for the sake of brevity.

The field emission electron source 110 of this embodiment is characterized by the structure of the drift region 161 in the strong electric field drift part 106 shown in FIG. 14. In this embodiment, the drift region 161 is a layer whose porosity changes continuously in the direction of thickness. In this case, the porosity increases continuously from the front surface toward the n-type silicon substrate 101. Components similar to those of the second embodiment will be denoted with the same reference numerals and the description thereof will be omitted.

Thus, since the field emission electron source 110 of this embodiment comprises adrift region 161 whose porosity changes continuously as described above, the overflow of the diode current can be suppressed more effectively and the efficiency of the electron emission can be enhanced, compared with the field emission electron source of the second embodiment.

The process of producing the field emission electron source of this embodiment is almost the same as that in the second embodiment and only the conditions of anodization are different. That is, in this embodiment, the current (current density) is changed continuously during anodization, with the result that the porosity of the porous layer described in the second embodiment changes continuously.

For example, the current density is increased (gradually) as time passes from the time when the anodization is started. At the time when the anodization is completed, a porous layer having the porosity increasing continuously in the direction of thickness from the front surface toward the n-type silicon substrate 101 is formed. The resulting porous layer is oxidized by a rapid thermal oxidation process to form a drift region 161 whose porosity changes continuously.

Although the present invention has been fully described in connection with the preferred embodiments thereof and the accompanying drawings, it is to be noted that various changes and modifications are apparent to those skilled in the art. Such changes and modifications are to be understood as included within the scope of the present invention as defined by the appended claims unless they depart therefrom.

The present disclosure relates to subject matter contained in Japanese Patent Application Nos. HEI 10-272342, filed Sep. 25, 1998, and HEI 11-115707, filed Apr. 23, 1999, the contents of both being expressly incorporated herein by reference in their entireties.

What is claimed is:

1. A method of manufacturing a field emission electron source that comprises (i) an electrically conductive substrate having principal surfaces; (ii) a strong electric field drift layer which is formed on one of the principal surfaces of said electrically conductive substrate and comprises at least drift regions for drifting electrons therethrough and heat radiation regions having a heat conductivity better than that of said drift regions, both regions being mixed and distributed uniformly on said one of the principal surfaces of said electrically conductive substrate, said strong electric field drift layer comprising at least a) semiconductor crystal regions formed in a manner to stand up vertically on said one of the principal surfaces of said electrically conductive substrate, and b) interspersed between said semiconductor crystal regions, semiconductor micro-crystal regions having nano-structures with a first insulating film having a thickness smaller than that of a micro-crystal of said semiconductor micro-crystal regions formed on a surface of said micro-crystal; and (iii) a surface electrode of a thin conductive film formed on said strong electric field drift layer; the method comprising:

making a part of a semiconductor region on said one of the principal surfaces of the electrically conductive substrate porous by anodization in a direction of thickness through a mask having a pattern of uniformly distributed voids;

oxidizing the semiconductor region which has been made porous in correspondence to the pattern of said mask to form said strong electric field drift layer comprising said drift regions and said heat radiation regions;

forming a surface electrode made of a thin conductive film on said strong electric field drift layer.

2. The method of claim 1, wherein said mask has a pattern of uniformly distributed, minute polygon- or minute circle-shaped voids and is arranged on the semiconductor region, whereafter said anodization is effected.

3. The method of claim 1, wherein a magnetic field is applied to said electrically conductive substrate during the anodization in such a manner that the rate of making the semiconductor region porous in a direction vertical to said one of the principal surfaces of the electrically conductive substrate is much faster than that in other directions.

4. The method of claim 1, wherein a poly-crystal semiconductor is formed as a column on said one of the principal surfaces of the electrically conductive substrate and then said anodization is effected.

5. The method of claim 1, wherein said anodization is carried out with a constant current density under irradiation with light.

6. A field emission electron source comprising:

an electrically conductive substrate having principal surfaces;

a strong electric field drift layer formed on one of the principal surfaces of said electrically conductive substrate and comprising at least semiconductor crystal regions formed in a manner to stand up vertically on said one of the principal surfaces of said electrically conductive substrate and, interspersed between said semiconductor crystal regions, semiconductor micro-crystal regions having nano-structures with a first insulating film having a thickness smaller than that of a micro-crystal of said semiconductor micro-crystal regions formed on a surface of said micro-crystal;

a surface electrode of a thin conductive film formed on said strong electric field drift layer, wherein said strong electric field drift layer comprises at least a) drift regions for drifting electrons therethrough, a cross section whereof at a right angle to a direction of thickness of said electrically conductive substrate has a mesh structure, and b) heat radiation regions having a heat conductivity better than that of said drift regions and being located in openings of the mesh, both regions being mixed and distributed uniformly on said one of the principal surfaces of said electrically conductive substrate, wherein when a voltage is applied to make said surface electrode a positive electrode with respect to said electrically conductive substrate, electrons injected from said electrically conductive substrate are drifted in said strong electric field drift layer and are emitted through said surface electrode.

7. The field emission electron source of claim 6, wherein the openings of the mesh are in the form of uniformly distributed minute polygons or minute circles.

8. The field emission electron source of claim 6, wherein said drift regions and said heat radiation regions are made of any one of a silicon single-crystal, a silicon carbide single-crystal, a silicon poly-crystal, a silicon carbide poly-crystal, an amorphous silicon or an amorphous silicon carbide.

9. The field emission electron source of claim 6, wherein said semiconductor micro-crystal regions are made of a porous semiconductor material obtained by anodization.

10. The field emission electron source of claim 6, wherein said heat radiation regions are covered on the surface thereof by a second insulating film selected from one of an oxide film or a nitride film.

11. The field emission electron source of claim 6, wherein said first insulating film is selected from one of an oxide film or a nitride film.

12. The field emission electron source of claim 6, wherein the electrically conductive substrate is a substrate on a principal surface of which an electrically conductive film is formed.

13. The field emission electron source of claim 6, wherein said surface electrode is a thin metal film.

14. The field emission electron source of claim 6, wherein said surface electrode comprises a thin gold film.

15. The field emission electron source of claim 6, wherein said electrically conductive substrate has an ohmic electrode on a back surface thereof.

16. The field emission electron source of claim 6, wherein said electrically conductive substrate comprises an n-type silicon substrate and said strong electric field drift layer is formed from an undoped polysilicon layer.

17. A vacuum chamber, said vacuum chamber housing the field emission electron source of claim 6 and a collector electrode.

* * * * *